Dec. 16, 1952 T. H. URDAHL 2,621,753
UNIT DESICCATOR
Filed Jan. 29, 1948

Inventor
Thomas H. Urdahl,

By
Sol B Wiggs
Attorney

Patented Dec. 16, 1952

2,621,753

UNITED STATES PATENT OFFICE 2,621,753

UNIT DESICCATOR

Thomas H. Urdahl, Washington, D. C., assignor to Dry Air Products Co., Washington, D. C., a corporation of Florida Application January 29, 1948, Serial No. 5,101

2 Claims. (Cl. 183—4.8)

The present invention relates to unit type desiccants wherein granular desiccant is disposed in a perforated container which may be placed in enclosed spaces to be maintained in dry condition by adsorption or absorption of the moisture from gases therein, and in particular, to a unit desiccant so constructed as to have a controlled adsorption or absorption rate and to prevent loss of fine, dust-like desiccant material through the perforations thereof.

Desiccant materials of the type herein contemplated are fine granular and somewhat friable, particulate material which has a normal tendency to abrade and form dust in the highly dried state in which it is used. In storage and use and in regeneration from time to time, wherein the unit is heated to a high temperature to evaporate the moisture, the desiccant is considerably shaken and stirred up which accelerates the dust formation. This dust emitted from the perforated container, variable with composition, contaminates, corrodes and acts as abrasive in the instruments, machinery and fine mechanisms which unit desiccants are intended to protect against damaging effects of moisture, hence the unit desiccant tending to emit dust is of lower practical utility.

Such desiccant materials as activated alumina, silica gel, absorbent and adsorbent clays as well as anhydrous acids and salts such as phosphoric anhydride calcium chloride, sodium and calcium sulfates are useful desiccants for these unit structures.

It is known in the art to place such materials in perforated containers and/or to dispose such materials within woven fabric type bags. Such practices of the art have been unsatisfactory for purposes of preventing passage of particles of dust-like fineness through the interstices of the woven fabric and the fabric is generally degenerated by the chemical action of the materials, the heat of regeneration, or both. Moreover, while such fibrous materials have moisture adsorbing properties, such moisture adsorption is not readily susceptible to control since the fibers tend to swell and give a variable moisture adsorption rate.

It is an object of the present invention to protect the perforated container from emission of dust from the desiccant materials contained therein by surrounding and/or separating the desiccant from the perforated walls by inert inorganic fibrous material disposed in a mat or felt which serves to filter out the particles and prevent their emission through the perforated walls without impeding normal capacity for adsorbing moisture by the unit.

It is a further object to mat the fiber in a controlled degree of thickness whereby the rate of moisture passage therethrough may be controlled.

According to the present invention fibrous inorganic materials, capable of being matted or felted such as fibrous asbestos, fiberglass and similar fibrous inorganic materials capable of tolerating high regenerative temperatures and sometimes in the presence of generally acid reacting type desiccant material is used. The present invention is explained with reference to the accompanying drawing.

Figure 1:
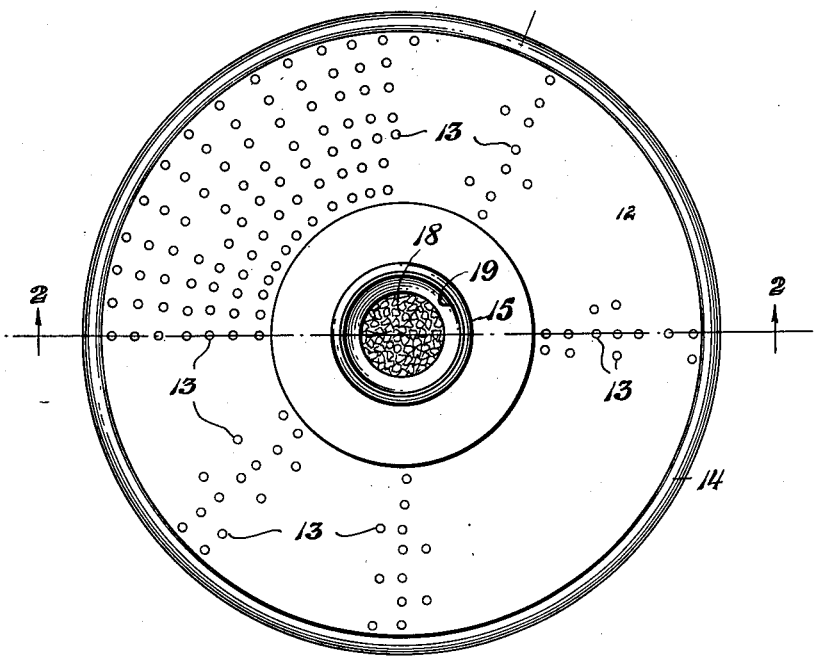
Fig. 1 is a plan view of a typical unit desiccant.
Figure 2:
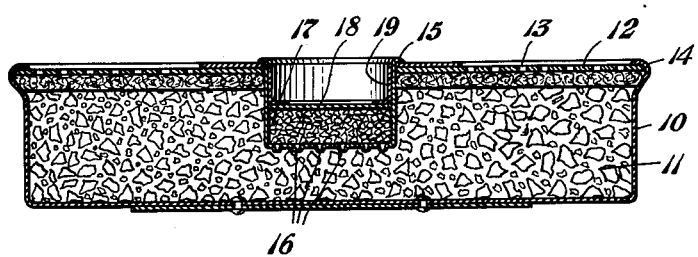
Fig. 2 is a sectional elevation thereof taken on line 2—2 of Fig. 1.

As shown in the drawing, the unit comprises a cylindrical container-like body 10 containing the desiccant material 11 in various sizes of granular to dust-like form of any moisture adsorbent or absorbent character as mentioned above. A dust filter comprising a dried matted layer 12 of washed and graded fibrous asbestos is disposed over the surface of said container. This matted layer may be any fibrous inorganic material with good vapor permeability and good heat resistance such as fibrous asbestos or fiberglass or similar materials. A top wall of perforated metal 13, forming in this instance a cover for the container and allowing free passage of air to the desiccant through the perforations and matted asbestos, is disposed at the outer surface and may be crimped in place at the intersecting edges 14 to form a relatively permanent dust-tight construction.

If desired, an indicator thimble 15 may be centrally or otherwise disposed by press fitting into the unit. The indicator thimble, as shown is generally cylindrical, having a perforated bottom 16 contiguous with the desiccant material to allow passage of moisture from the body of the desiccant into the thimble. Moisture indicating material 17 is placed in the bottom of the thimble in the form of granules, comprising any carrier impregnated with cobalt chloride, and the thimble is covered with a glass or other transparent window material 18 held in place by grommet 19. The thimble and contents act as an indicator to show the moisture content of the desiccant in that granules impregnated with cobalt chloride will give a color change after a certain amount of moisture has been adsorbed or absorbed and such color change will indicate when the desiccant has been substantially exhausted and needs regeneration.

Conversely the cobalt chloride indicator upon proper drying of the desiccant by heat will be returned to its original color. Thus, by suitable color changes the indicator will show the quality of the desiccant under all conditions of storage, use, regeneration and even abuse if both desiccant and indicator are heated excessively.

The fibrous material, such for example as asbestos, is graded as to be readily matted, all of the smaller fibers shorter than 1/8" having been removed so that the asbestos does not tend to pack. The mat is of substantial thickness as to filter out very fine particles of dust. The material has desirably been washed further to remove all particles of dustlike character so that it in itself will not be a source of dust. It will be evident that by varying the thickness and density of the moisture permeable matted layer, a means for controlling the rate of adsorption of the desiccant is obtained which is a highly desirable feature as it is in many cases preferable to slow down the rate of adsorption thus prolonging the time period between reactivation of the unit desiccant.

For this purpose the matted layer is produced in matted sheets of various thicknesses, for example, ranging from .01 to .25 inch depending upon the rate of moisture absorption or adsorption desired. The matted sheets may be formed by typical felting of fiber methods such as suspending the fiber in a liquid as a pulp of desired concentration and then filtering off the liquid as on a Fourdrinier machine screen.

The mat may be formed without a binder, but application of a binder, at least for temporary use while the paper is being formed, is preferred. For this purpose permanent resins such as soluble Bakelite or furfural types and wet strength improving resins are added to the liquid suspending medium. It is preferred, however, to use a binder of a temporary character such as starch. For this purpose a small amount of starch, such as a .05-3% solution of starch in water, is used as the suspending liquid. After formation of such mat the paper is dried at high temperatures of the order of 250° to 350° C. wherein the starch is decomposed.

In use, the construction described may be used and regenerated at normal intervals without emitting any dust.

It will be appreciated that in the actual construction considerable variation is possible as to the shape of the container, and the disposition of perforations. Thus the container may have perforations in the sides and/or in both top and bottom. It will be understood that in each case the matted layer will be placed on the perforations to prevent dusting from any area and when disposition of perforations warrant, the matted layer may completely surround and enclose the dust-forming desiccant.

Similarly the disposition of the moisture indicator eye may be through any part of the container wall, top or bottom. The present construction is preferred because it is a more efficient construction, the top being pre-assembled if desired with the indicator eye and crimped in place by rounding over the side walls, the matted fiber sustaining the top resiliently during the crimping to give a highly efficient dust-tight joint.

Various modifications will occur to those skilled in the art and it is intended that the invention be interpreted as broadly as defined in the claims.

I claim:

1. Heat regenerative unit gas desiccator comprising a container of relatively great flat area and small thickness having a perforated metallic wall forming one side of said container adjacent the extended flat area whereby to present a relatively large area to the absorption of moisture through said perforated wall with respect to the total volume of desiccant materials confined within said container, a body of granular to dust-like particles of desiccant material substantially filling said container, and a sheet of asbestos fiber mounted in said container between said desiccant particles and said perforated wall, said sheet consisting of graded asbestos fiber longer than about 1/8 inch, said fibers being cohered by a residue of a thermally decomposed organic binder substance to a stable porous fibrous sheet having a thickness in the range of .01 to .25 inch, said sheet inherently having a capacity to absorb moisture from the air and slowly redistribute the same to the body of desiccant material thereneath proportional to said thickness.

2. The heat regenerative unit gas desiccator defined in claim 1 wherein the container is a flat annular disc-like body having centrally disposed in the perforated wall thereof a relatively small cylindrical thimble containing a chemical moisture-indicating material, said thimble having its inner end closed by a perforated wall in direct moisture transferring content with the center of said desiccant material, the outer end of said thimble being closed by a window of heat resistant transparent material.

THOMAS H. URDAHL.

REFERENCES CITED

The following references are of record in the file of this patent:

UNITED STATES PATENTS

| Number | Name | Date |
|---|---|---|
| 2,251,964 | Stackhouse | Aug. 12, 1941 |
| 2,325,657 | Burkness | Aug. 3, 1943 |
| 2,399,971 | Wolfe | May 7, 1946 |
| 2,469,435 | Hirsch | May 10, 1949 |

FOREIGN PATENTS

| Number | Country | Date |
|---|---|---|
| 315,498 | Great Britain | July 18, 1929 |
| 345,672 | Great Britain | Mar. 23, 1931 |
| 437,139 | Great Britain | Oct. 24, 1935 |
| 754,333 | France | Aug. 28, 1933 |